United States Patent
Cole

[11] 3,977,855
[45] Aug. 31, 1976

[54] METHOD OF MAKING FIBER OPTIC DEVICE

[75] Inventor: Henry B. Cole, East Woodstock, Conn.

[73] Assignee: American Optical Corporation, Southbridge, Mass.

[22] Filed: June 11, 1971

[21] Appl. No.: 155,667

[52] U.S. Cl.................................. 65/4 B; 350/96 B; 65/DIG. 7
[51] Int. Cl.².......................................... C03C 23/00
[58] Field of Search ............. 65/4, 3, 271, 319, 355, 65/356, 4 B, DIG. 7; 350/96 B

[56] References Cited
UNITED STATES PATENTS

| | | | |
|---|---|---|---|
| 3,227,535 | 1/1966 | Woodcock | 65/4 |
| 3,241,934 | 3/1966 | Granitsas et al. | 65/3 |
| 3,247,756 | 4/1966 | Siegmund | 350/96 B |
| 3,328,143 | 6/1967 | Hicks, Jr. | 65/4 |
| 3,625,669 | 12/1971 | Norton | 65/4 |
| 3,674,452 | 7/1972 | Strack | 350/96 B |

*Primary Examiner*—Leland A. Sebastian
*Attorney, Agent, or Firm*—William C. Nealon

[57] ABSTRACT

A shortened image inverter formed of a plurality of light-conducting fibers arranged in side-by-side relationship with each other as a bundle having opposite image-receiving and image-emitting faces; the bundle being twisted intermediately of its opposite end faces by the amount of 180° and compressed axially for shortening.

8 Claims, 7 Drawing Figures

U.S. Patent    Aug. 31, 1976    3,977,855
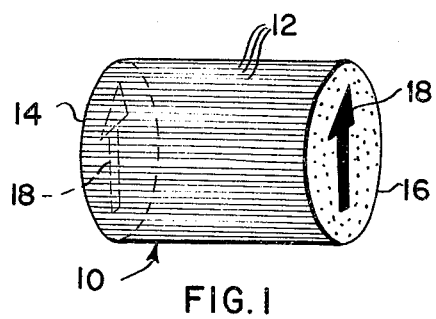
FIG. 1
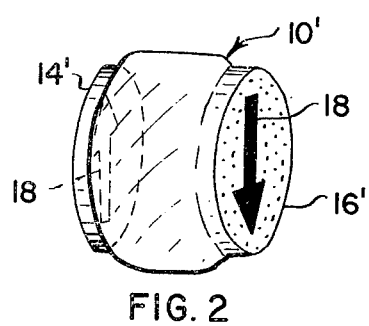
FIG. 2
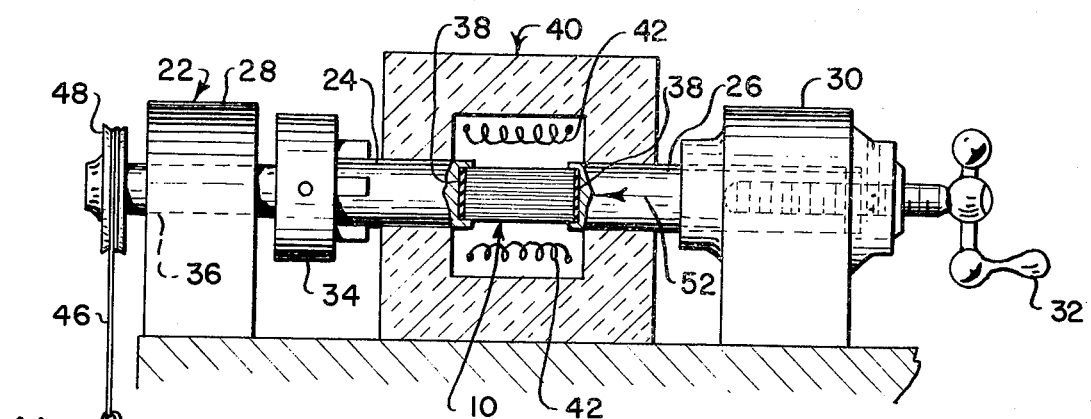
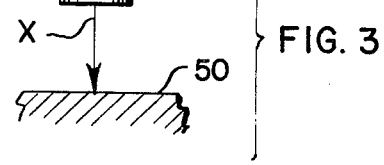
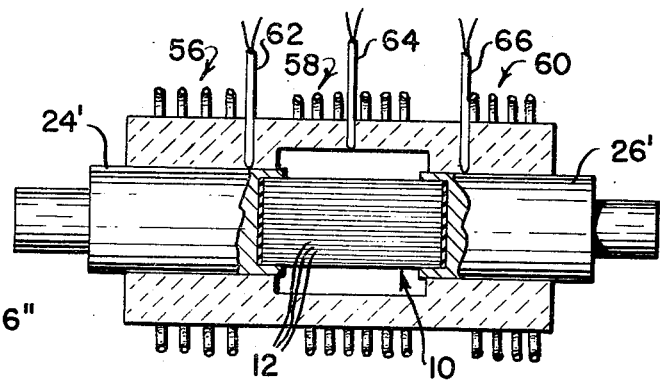
FIG. 4
FIG. 3
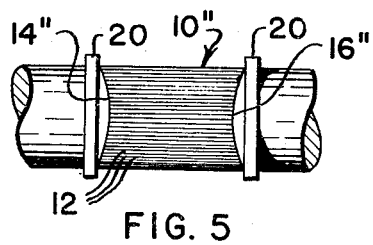
FIG. 5
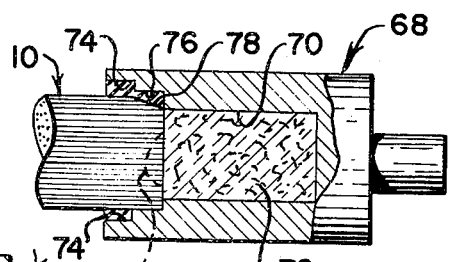
FIG. 6
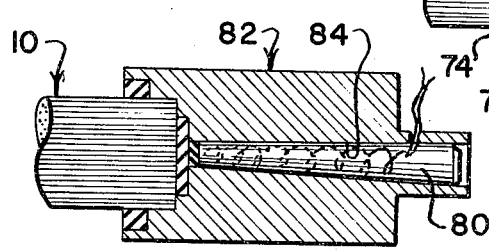
FIG. 7
INVENTOR.
HENRY B. COLE
BY
ATTORNEY

METHOD OF MAKING FIBER OPTIC DEVICE

BACKGROUND OF THE INVENTION

1. Field of the Invention:

Fiber optic image-transmitting devices with particular reference to axially compressed bundles of optical fibers having substantially identically geometrically patterned opposite end faces, one inverted relative to the other by a 180° axial twist in the bundle, and method of making same.

2. Description of the Prior Art

Fiber optical image inverters formed by twisting imagetransmitting bundles of optical fibers have, heretofor, suffered substantial losses in effective numerical aperture and transmisson. This due to stretching and consequent constriction or tapering of individual fiber elements by amounts which increase from the centermost fibers outwardly of the bundle. This reduction in effective numerical aperture and transmission causes vingnetting of images emitted by the twisted bundle.

Efforts to decrease the length of fiber optic image inverters in relation to their diameters increase the relative stretching and optical performance losses so that when space limitations on the use of fiber optic image inverters places a premium on minimum length, a sacrifice in optical performance has been the rule.

According to the present invention, however, optical performance is optimized in fiber optic image inverters of notably shortened over-all lengths.

SUMMARY OF THE INVENTION

The present concept in accomplishing the shortening of fiber optical image inverters without appreciable, if any, sacrifice of optical performance is accomplished by axially compressing the bundle of optical fibers which make up the inverter.

With the bundle of fibers heated to a suitable softening temperature for twisting, it is twisted 180° with axial compression effected before, during or following the twisting operation. A desirable practice is to accomplish both twisting and compression simultaneously. In any case, heating of the bundle is carefully controlled to prevent fiber distortion or displacement of fibers adjacent opposite image receiving and emitting ends of the bundle. For optimum definition of images transmitted by fiber bundles, corresponding opposite ends of fibers of respective bundles must be substantially identically geometrically patterned even though all inverted at one end of the bundle.

For a given final length and working diameter, the aforesaid axial compression allows the use of a greater than usual initial length of fiber bundle (i.e. before twisting) so that relative stretching and constriction taking place during twisting is less than would occur in prior art uncompressed bundles having to meet identical requirements of overall finished axial length. Thus, according to this invention, there is accomplished minimal necking-down, tapering or constriction of individual fiber elements with a corresponding minimal loss of working numerical aperture and vingnetting of images conveyed by the resulting image inverter.

The present invention will be more fully understood by reference to the following detailed description when taken in conjunction with the accompanying drawings.

IN THE DRAWINGS

FIG. 1 is a perspective illustration of an image-conducting bundle of optical fibers which is reresentative of a type utilized to form, by twisting and compression, an image inverter according to principles of the present invention;

FIG. 2 is a perspective illustration of a type of image inverter formed according to this invention;

FIG. 3 is a partially cross-sectioned diagrammatic illustration of apparatus used in making the image inverter exemplified by FIG. 2;

FIG. 4 is a partially cross-sectioned elevational view of a modification of the apparatus shown in FIG. 3;

FIG. 5 is a fragmentary diagrammatic illustration of another form of apparatus and technique for forming the image inverter; and FIGS. 6 and 7 are still further modifications of apparatus both applicable to the FIG. 3 embodiment thereof.

DESCRIPTION OF THE PREFERRED EMBODIMENTS

Referring more particularly to FIG. 1, there is depicted a bundle 10 of optical fibers 12 having their corresponding opposite ends arranged in identical geometrical patterns as image-receiving and emitting faces 14 and 16 respectively. As such, bundle 10 is adapted to receive an optical image (e.g. arrow 18) at its receiving end 14 and, by conduction of image 18 through the fibers 12, emit same at end 16 of the bundle. Fibers 12 in bundle 10 are preferably all tightly fused together, each being of the monofilament type (having a single light-conducting core) or, alternatively, of the multifiber type (each comprising a plurality of light-conducting cores separated by individual claddings and all fused together). The fibers 12 are typically preferably formed of glass of high refractive index and each clad with a relatively thin integral jacket of glass having a low refractive index. In addition to forming a light-reflecting interface along each fiber, the latter also functions as a connecting medium by means of which the fibers are fused to one another. They may, if desired, have second claddings of low melting temperature and/or light absorbing glass or alternatively, be provided with interstitial stray light absorbing fibers or the like.

Those interested in details of construction, function and use of fibers such as the aforementioned may refer to U.S. Pat. Nos. 992,516; 3,037,241; 3,060,789; 3,253,896; 3,253,500; and 3,247,756 for exemplification.

Utilizing the greater length of bundle 10 (FIG. 1) to form the much shorter image inverter 10' (FIG. 2) by heat softening its intermediate section, twisting 180° and compressing the whole bundle in the direction of its axis, the advantage of minimal fiber stretching and consequent constriction with corresponding numerical aperture reduction is realized. Image inverter 10' thus formed will, upon receiving the image of arrow 18 upon its face 14', emit the same image 18, but inverted at face 16'. In view of the aforementioned minimal fiber stretching, vingnetting of the emitted image 18 (FIG. 2) is minimized.

While the use of bundle 10 (FIG. 1) having flat opposite end faces 14 and 16, by reason of its initial relatively great length, will produce minimal outer fiber stretching or attenuation, it is also contemplated that opposite end faces 14'' and 16'' of a similar bundle 10'' (FIG. 5) may be ground or otherwise formed to a convex shape as shown. Thus, before or during or after 180° twisting of the bundle 10'' it may be pressed axially for shortening. The attenuation caused by the twisting over the longer length and by the compressing results in less total constriction of the fiber than does the attenuation which occurs if the inverter is twisted over the shorter length without any compression.

Referring now more particularly to apparatus for accomplishing the twisting and axial compression of a bundle of optical fibers 10 or 10', the invention contemplates the utilization of lathe-type apparatus 22 (FIG. 3). Fiber bundle holders in the form of endpieces 24 and 26 are respectively supported in the headstock 28 and tailstock 30 of apparatus 22. Endpiece 26 is fixed against rotational movement in tailstock 30 but is selectively adjustable longitudinally toward headstock 28 by operation of crank 32. Endpiece 24, in turn, is supported by chuck 34 on spindle 36 which is journaled in headstock 28.

Fiber bundle 10 having its axis coincident with the common axis of spindle 36, chuck 34 and endpiece 24 is fixedly secured by a ceramic cement or its equivalent 38 at each of its opposite ends respectively to endpieces 24 and 26.

Surrounding fiber bundle 10 is furnace 40 having suitable heating means (e.g. electrical heating coils 42) therein. Thus, the periphery of fiber bundle 10 is heated by elements 42 to a point where the major portion of the length of the bundle between endpieces 24 and 26 becomes softened for axial twisting. Endpieces 24 and 26, acting as heat-sinks, however, absorb and dissipate substantial amounts of heat flow opposite ends of bundle 10 keeping these ends relatively cool and not susceptable to distortion.

Upon bringing fiber bundle 10 to a predetermined suitable temperature for twisting, a weight 44 on cord 46 which is suspended from pulley 48 is permitted to drop under the force of gravity over a distance X against a stop 50. Either the position of stop 50 or the initial starting point of weight 44 above stop 50 is preset to render distance X sufficient only to produce one accurate 180° axial twist of one end of bundle 10 relative to its opposite end.

Before, during or following the aforesaid twisting of bundle 10, endpiece 26 is moved in the direction of arrow 52 by operation of crank 32 thereby effecting axial compression of bundle 10, the amount of which is determined by the extent of such movement of endpiece 26 toward endpiece 24.

For optical fibers 12 having core parts formed of optical flint glass with claddings of optical crown glass, the heating of peripheral portions of a bundle thereof such as bundle 10 to a temperature of approximately 1250 degrees Fahrenheit has been determined to produce satisfactory results in conditioning the bundle for the aforesaid twisting and compression operation. A log viscosity of 8 or higher for core and cladding glasses will produce the best results in optical blemish-free quality. Slow cooling and removal of the twisted and compressed bundle 10 from apparatus 22 completes the shortened image inverter 10' depicted in FIG. 2. Typically, an inverter 10' may comprise an approximately ¾ inch diameter bundle of fibers initially approximately 1 inch long, axially twisted 180° and shortened to approximately ¾ inch in length.

Modification of the apparatus of FIG. 3 may include alteration of furnace 40 to the general arrangement and configuration of the furnace which is shown diagrammatically in FIG. 4. There, optical fiber bundle 10 is supported by endpiece 24' and 26' in essentially the same manner as already described with relation to the corresponding pieces 24 and 26 of FIG. 3. The furnace, however, comprises a cylinder of high heat resistant material (e.g. alumina) which is surrounded by three sections 56, 58 and 60 of high electrical resistance heating wire. Positioned in the furnace adjacent each of the sections of wire, are thermocouples 62, 64 and 66 respectively. The centermost coil 58 is controlled by thermocouple 64 and is utilized to heat the intermediate portion of fiber bundle 10 to a temperature suitable for twisting and compression as described hereinabove. Sections 56 and 60 of heating wire are respectively controlled by the thermocouples 62 and 66. These are regulated to control temperatures of opposite ends of the fiber bundle 10. These ends are maintained at temperatures below softening so as to avoid distortion or displacement of portions of fibers 12 adjacent such ends while, at the same time, permitting a heating of a maximum amount of the intermediate portions of fibers 12 to softening temperature for the twisting of bundle 10.

Further modifications of endpieces for supporting fiber bundles during twisting and axial compression are shown in FIGS. 6 and 7. These endpieces are formed of a high temperature-resistant steel, this, preferably, also being the case with respect to other endpieces described hereinabove. Endpiece 68, however, is provided with a centrally disposed deep internal cavity 70, the major portion of which is filled with a fiberous heat-insulating material. Thus, with fiber bundle 10 cemented in the endpiece and abutting the insulation 72 as illustrated, the aforementioned sinking of heat at opposite ends of the fiber bundle is effected essentially only at outer peripheral portions of the bundle. It should be understood that an endpiece substantially identical to endpiece 68 would ordinarily be applied to the opposite end of fiber bundle 10 which is not shown in FIG. 6. Since thermal conduction is known to be greater along the length of fibers in bundles such as bundle 10 than in transverse directions thereof, insulation 72 functions to reduce radial thermal gradients. Also provided in endpiece 68 are recesses 74 where cement 76 is applied to secure fiber bundle 10 in place.

Notches 78 may be cut into opposite ends of bundle 10 permitting cement 76 to enter thereinto and function, in each case, as a key to prevent rotational slippage of the bundle during its twisting.

In a manner analogous to the controlled heating of endpieces 24' and 26' (FIG. 4) there is shown in FIG. 7 a still further endpiece modification. This, as diagrammatically illustrated in FIG. 7, includes the substitution for heating coils 56 or 60 of a heating element 80 extended coaxially into end piece 82. Heating element 80 is conical and is fitted into a correspondingly shaped tapered opening 84. Thus, a tightfitting relationship between corresponding surfaces of heating element 80 and endpiece 82 can be readily accomplished so as to optimize the conduction of heat from element 80 into endpiece 82 proper.

I claim:

1. The method of making a fiber optic image inverter comprising the steps of:

forming a bundle of a multiplicity of individual light-conducting fibers arranged in side-by-side parallel relationship with each other and all fused together with corresponding opposite ends of the fibers substantially geometrically identically patterned as opposite image-receiving and image-emitting end faces of the bundle, said bundle being substantially longer than the ultimate finished length of said image inverter;

heating a major portion of the length of said bundle intermediately of said opposite faces thereof to a softening temperature suitable for axial twisting thereof;

axially twisting said bundle sufficiently to invert one of said end faces 180° relative to the other end face;

compressing said bundle axially an amount sufficient to substantially shorten its length between said opposite end faces; and cooling said bundle to a hardened state;

said step of compressing being effected at any preselected stage of processing between said steps of heating and cooling said bundle.

2. The method according to claim 1 wherein said step of compressing said bundle is effected prior to said axial twisting thereof.

3. The method according to claim 1 wherein said step of compressing said bundle is effected during said step of axial twisting thereof.

4. The method according to claim 1 wherein said step of compressing said bundle is effected subsequent to said step of axial twisting thereof.

5. The method according to claim 1 wherein opposite ends of said bundles of fibers are maintained at substantially lower temperatures than said intermediate portion thereof during said steps of twisting and compressing said bundle.

6. The method according to claim 5 wherein thermostatic control of heating said intermediate portion and opposite ends of said bundle is utilized to effect said respective differential heating.

7. The method according to claim 5 wherein heat is dissipated from said opposite ends of said bundle to effect said differential heating.

8. The method according to claim 7 wherein dissipation of said heat is caused to occur mainly from outermost fibers of said bundle adjacent respective opposite ends thereof.

* * * * *